(No Model.)
W. C. CLARKE.
ART OF PRODUCING CARBIDE OF CALCIUM.
No. 551,461. Patented Dec. 17, 1895.
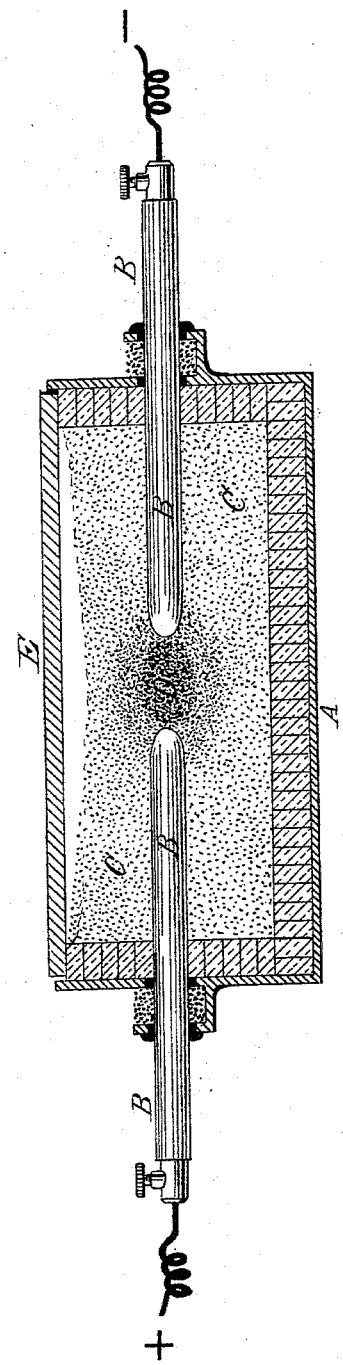
Witnesses:
Raphaïl Netter
Amise W. Baylis.
Inventor
William C. Clarke
by Clarkson A. Collins,
Att'y.

UNITED STATES PATENT OFFICE.

WILLIAM C. CLARKE, OF NEW YORK, N. Y.

ART OF PRODUCING CARBIDE OF CALCIUM.

SPECIFICATION forming part of Letters Patent No. 551,461, dated December 17, 1895.

Application filed April 29, 1895. Serial No. 547,593. (No model.)

*To all whom it may concern:*

Be it known that I, WILLIAM C. CLARKE, a citizen of the United States, residing in the city of New York, in the county and State of New York, have invented certain new and useful Improvements in the Art of Producing Carbide of Calcium, of which the following is a specification.

Heretofore this substance has been made by subjecting a mixture of pulverized carbon and lime to a high degree of heat in an electric furnace, the material to be treated being placed between vertical electrodes and an arc being maintained immediately above the material under treatment. The reduction of metallic compounds has also been effected in an electric furnace in which the electrodes are placed horizontally. In either case the furnace has been charged with such a quantity of the material to be treated that substantially all of it was subjected to the effective action of the current, or, in other words, came within the zone of fusion set up or created by the current. The result of this in the manufacture of carbide of calcium is that the carbide which, when first formed and still subjected to heat, is in a soft fused state, but hardens on cooling into a stone-like mass, sticks to the sides of the furnace, or in case a brick-lined furnace is used becomes smelted to the brick, so that it can only be removed from the furnace with much difficulty. In case, also, vertical electrodes are employed and the heat for effecting the reduction is radiated from an arc, the upper electrode becomes intensely heated by the hot gases which rise up around it, so that it is readily attacked by the oxygen of the air and quickly destroyed, thus adding greatly to the expense of the process. In order to obviate these difficulties and reduce the cost of production, I employ an electric furnace in which the electrodes are placed horizontally, so that the hot gases set free in the process will pass directly away from the electrodes. I also charge the furnace with such a quantity of the material to be treated, consisting of pulverized carbon and lime, that a considerable proportion of the charge, both above and below the electrodes, will be outside of the zone of fusion and not sufficiently acted upon by the current to be reduced or decomposed. On bringing the electrodes together or nearly together and causing current to pass and then gradually separating the electrodes, so much of the material as receives sufficient current will be decomposed and converted into carbide of calcium. On shutting off the current before the terminals of the electrodes are drawn back to the wall of the furnace and then drawing the electrodes away from the fused mass, a core or body of carbide of calcium will remain lying in the path of the electrodes and out of contact with any part of the furnace. This can easily be dug out from the mass of pulverized material by which it is surrounded, and removed from the furnace. Some of the undecomposed carbon and lime, adjacent to the soft mass of carbide, will stick or be smelted thereto, thus forming a shell or covering which serves to protect the carbide from the action of the atmosphere, the moisture of which, as is well known, quickly combines with and decomposes the carbide.

On removing the carbide from the furnace, the material around it will fall into place between the electrodes ready to be acted upon and the electrodes are again brought together and the current turned on, and the operation is repeated. Fresh supplies of the mixed carbon and lime are thrown into the top of the furnace from time to time as required, to replace that which has been converted into carbide. If desired, the top of the furnace may be closed with a cover loosely laid on and perforated to permit the escape of the gases generated. This is not, however, necessary, as the mass of pulverized material in the furnace at any time is sufficient to protect the mass of hot carbide in process of formation from the effects of the atmosphere.

I have shown in the drawing a sectional view of an electrical furnace having horizontal electrodes which may be used in carrying my invention into effect.

A indicates the furnace, having horizontal electrodes B B.

C indicates the mass of pulverulent material with which the furnace is filled, and D a body of carbide in process of formation, between the electrodes.

In operating the furnace, which is first filled with a mass of pulverized carbon and lime, intimately mixed together in proper proportions, the current is turned on, when the electrodes B B are so nearly in contact that current will pass and the electrodes are then gradually drawn apart as the material between them is reduced by the intense heat generated by the passage of the current through the material which serves as an imperfect conductor. When the electrodes have been drawn back nearly to the walls of the furnace, the current is shut off, and when the carbide formed, which is at first in a fused, semi-liquid state, has sufficiently hardened, it is withdrawn from the furnace with hooks or grappling-tongs, or in any convenient manner. The pulverized material which lies immediately adjacent to the mass of carbide formed will stick or be smelted thereto, forming a thin coating or shell which will protect the carbide from the moisture of the atmosphere, while the material outside of this will be heated to a point which renders its subsequent reduction more easy than when it is cold. On the removal of the mass of carbide formed, the surrounding material falls into place between the electrodes, which are then again brought together and the operation is repeated as often as required.

Any convenient means for separating and bringing together the electrodes may be employed and any convenient or well-known form or size of electric furnace may be used, so long as the electrodes occupy a substantially horizontal position. Nor is it essential that both electrodes shall be movable, as one of them may be fixed and terminate on the inside of the furnace at or near the wall thereof and their separation be effected by moving the other. In forming the mixture to be treated any form of carbon, such as coke or coal, may be employed and unslaked lime of good quality should be used. These are used in the proportion of about twelve parts of carbon to twenty parts of lime, and they should be finely pulverized and intimately mixed together, so that waste of the material may be avoided, and all of it used in the production of carbide.

What I claim as new, and desire to secure by Letters Patent, is—

The hereinbefore described process of making carbide of calcium, which consists in causing current to pass between horizontally disposed electrodes, embedded in a mass of pulverized and intimately commingled lime and carbon, of such extent that a material proportion thereof will remain undecomposed by the passage of the current and gradually separating the electrodes as the material between them is reduced, so as to produce between the electrodes a body of the carbide surrounded by an undecomposed mass of the pulverulent mixture.

In testimony whereof I have hereunto subscribed my name this 3d day of April, A. D. 1895.

WM. C. CLARKE.

Witnesses:
CLARKSON A. COLLINS,
WM. M. DAVIS.